(12) United States Patent
Scarpa et al.

(10) Patent No.: US 9,382,962 B2
(45) Date of Patent: Jul. 5, 2016

(54) VIBRATION DAMPING STRUCTURES

(75) Inventors: Fabrizio Scarpa, Bristol (GB);
Christopher W. Smith, Exeter (GB);
Wayne Miller, Exeter (GB); Kenneth Evans, Exeter (GB); Ramesh Rajasekaran, Derby (GB)

(73) Assignee: ROLLS-ROYCE plc, London (GB)

(*) Notice: Subject to any disclaimer, the term of this patent is extended or adjusted under 35 U.S.C. 154(b) by 893 days.

(21) Appl. No.: 13/580,245

(22) PCT Filed: Feb. 8, 2011

(86) PCT No.: PCT/EP2011/051790
§ 371 (c)(1),
(2), (4) Date: Aug. 21, 2012

(87) PCT Pub. No.: WO2011/104112
PCT Pub. Date: Sep. 1, 2011

(65) Prior Publication Data
US 2012/0315456 A1    Dec. 13, 2012

(30) Foreign Application Priority Data

Feb. 23, 2010  (GB) .................................. 1003012.0

(51) Int. Cl.
F16F 7/12   (2006.01)
B32B 3/12   (2006.01)
F16F 3/093  (2006.01)

(52) U.S. Cl.
CPC . F16F 7/121 (2013.01); B32B 3/12 (2013.01);
F16F 3/093 (2013.01); Y10T 428/249921 (2015.04)

(58) Field of Classification Search
None
See application file for complete search history.

(56) References Cited

U.S. PATENT DOCUMENTS

| 2006/0163431 | A1  | 7/2006  | Dittrich |
| 2006/0208135 | A1* | 9/2006  | Liguore et al. ............ 244/117 R |
| 2006/0286342 | A1  | 12/2006 | Elzey |
| 2009/0184200 | A1* | 7/2009  | Lin et al. ........................ 244/119 |
| 2011/0033655 | A1* | 2/2011  | Duchene ........................ 428/118 |
| 2012/0177877 | A1* | 7/2012  | Lebail et al. ................... 428/116 |

FOREIGN PATENT DOCUMENTS

| EP | 1 612 108 A1 | 1/2006 |
| EP | 1 661 805 A1 | 5/2006 |
| EP | 1 811 129 A2 | 7/2007 |
| GB | 2 026 622 A  | 2/1980 |
| WO | WO 2005/089176 A2 | 9/2005 |

OTHER PUBLICATIONS

Jun. 17, 2010 Search Report issued in British Patent Application No. GB1003012.0.
May 26, 2011 International Search Report issued in International Application No. PCT/EP2011/051790.
May 26, 2011 Written Opinion issued in International Application No. PCT/EP2011/051790.

* cited by examiner

*Primary Examiner* — David Sample
*Assistant Examiner* — Nicholas W Jordan
(74) *Attorney, Agent, or Firm* — Oliff PLC

(57) ABSTRACT

A vibration damping body including an auxetic cellular structure having cell walls therein formed substantially of a first material having a first stiffness, the cellular structure further including a second material attached to said cell walls, the second material being selectively located throughout the cellular structure so as to include less than 50% by mass thereof and having a second stiffness which is lower than said first stiffness.

21 Claims, 4 Drawing Sheets

Fig.1
(Prior Art)
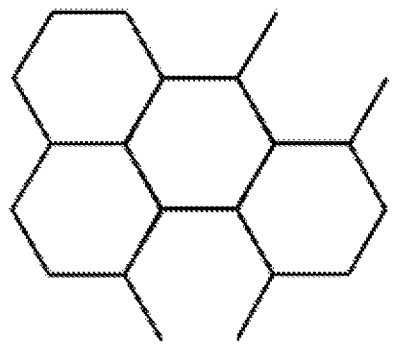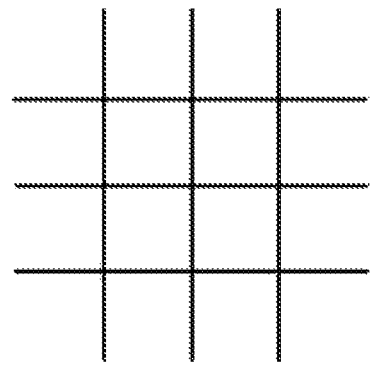
Fig.2
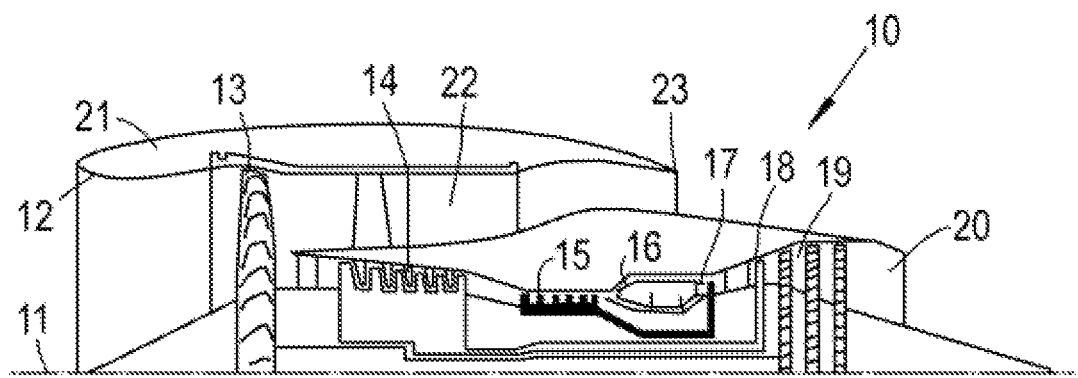

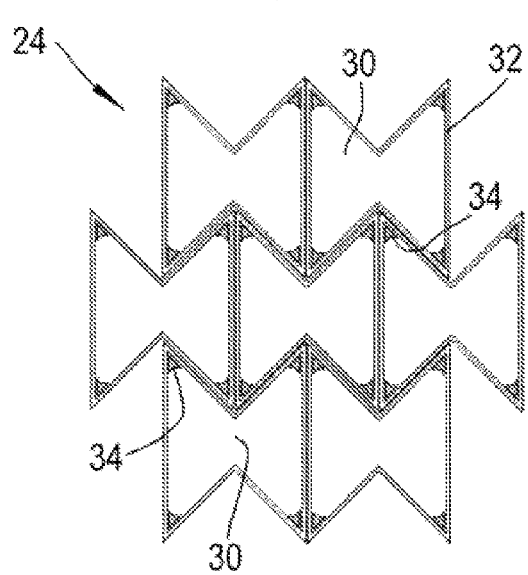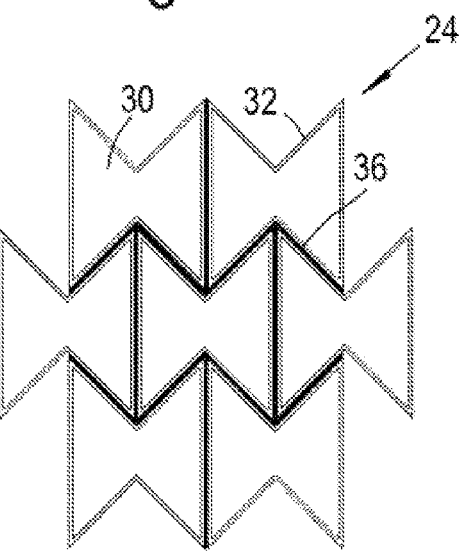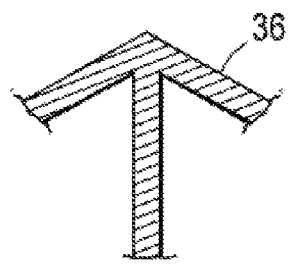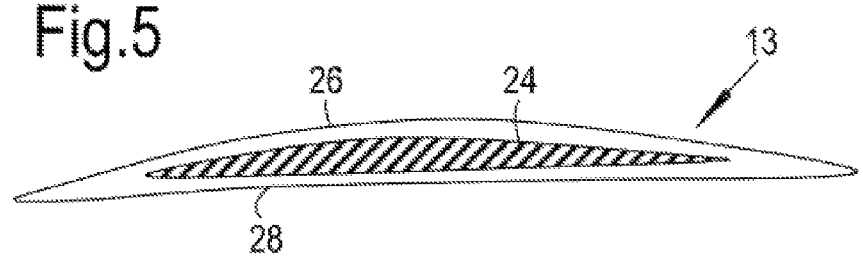

Tan Delta plotted against frequency for 3 ABS samples at 35°C

Masses of samples:
Re-entrant = 5.4g
Re-entrant + fillets = 6.7g
Re-entrant + interlayer = 6.8g Tan Delta plotted against frequency for 3 ABS honeycomb samples at -50°C

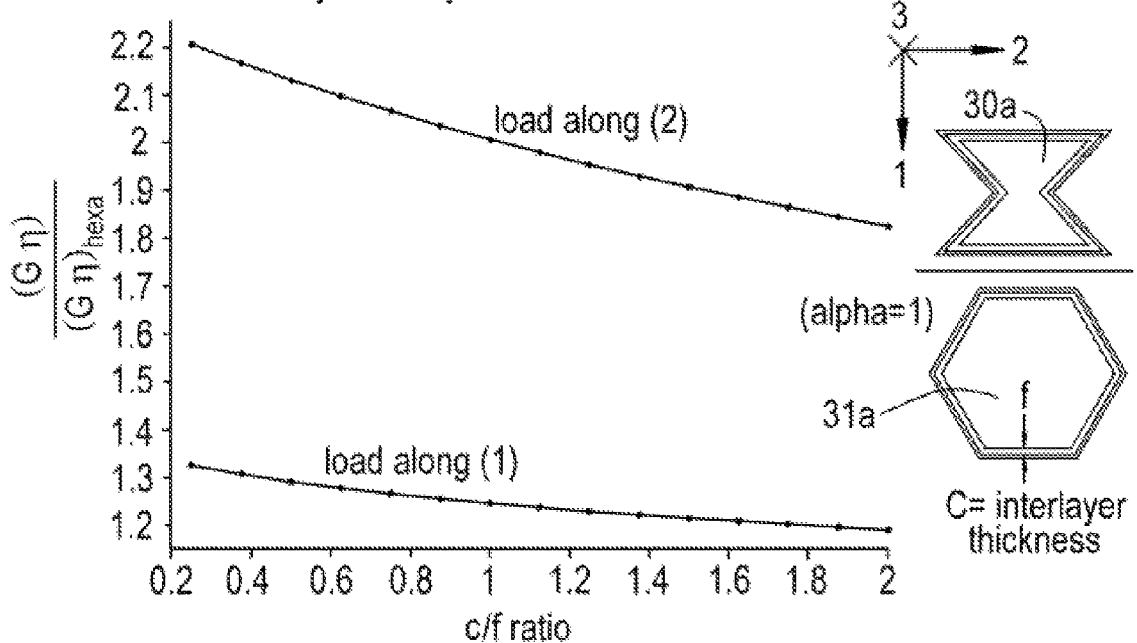
Fig. 8 out-of-plane (CLD) Constrained Layer Honeycomb
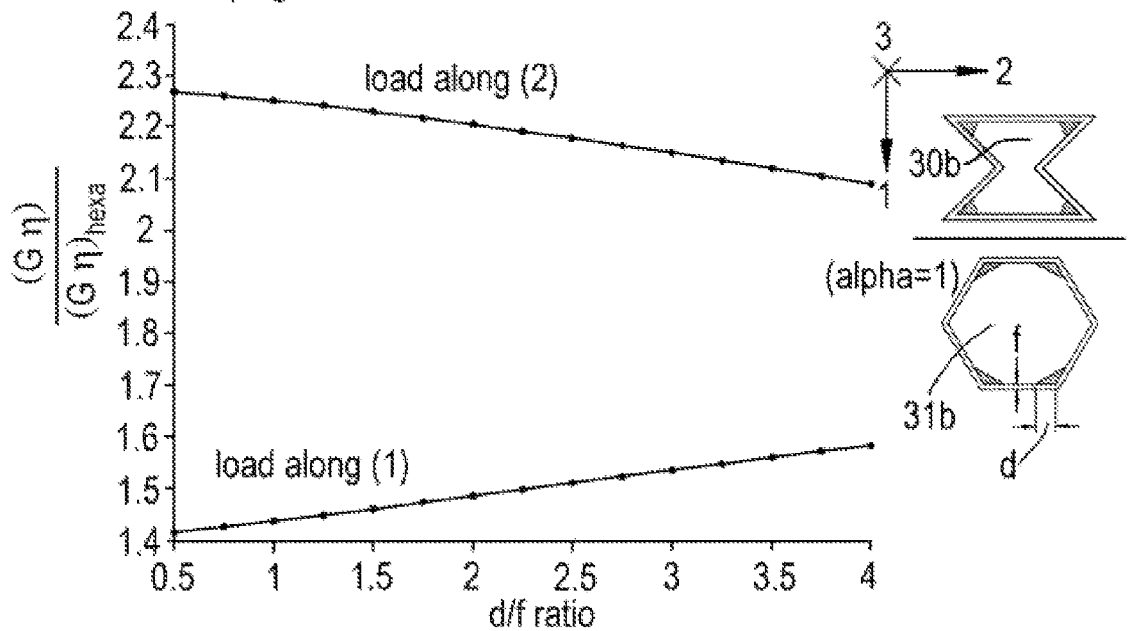
Fig. 9 out-of-plane (FD) Fillet Damping

VIBRATION DAMPING STRUCTURES

The present invention relates to vibration damping structures and, more particularly, to cellular materials, which may be used, for example, as vibration damping insert materials within components or other composite structures.

Cellular solids are used in a variety of engineering applications and conventional honeycomb cell structures have become widely used for their strength to weight characteristics. Examples of typical geometries of conventional cellular structures which have been used as cores in sandwich panels within, for example, the aerospace and marine industries are shown in FIG. 1.

Conventional materials for formation of the cell structure include aluminium, Nomex (aramid), Kevlar, other common thermoplastic polymers. Such structures can be considered to be 'monolithic' honeycombs since there is only one significant phase present, plus air.

The primary function of materials chosen for use as sandwich panel cores is to maintain a separation between opposing skins. Such materials are generally relatively stiff and display low loss coefficients. The ability of these monolithic honeycombs to absorb vibration energy, is dependent primarily upon the constituent material's inherent damping or loss coefficient and not upon geometrical properties of the structure. Thus the ability of such structures to benefit the damping behaviour of the structure is limited.

Furthermore, alternative materials which are known to have higher loss coefficients generally display lower stiffness characteristics and are unsuitable for use as structural components such as honeycomb cores. This unavoidable trade off between these two properties further compounds the above problem.

It is an aim of the present invention to provide cellular structures offering improved vibration damping properties, whilst avoiding or mitigating problems associated with reduced stiffness.

According to a first aspect of the present invention there is provided a cellular structure formed substantially of a first material having a first stiffness, the structure further comprising a second material therein, the second material having a second stiffness which is lower than said first stiffness.

In one embodiment, the cellular structure comprises an auxetic cellular structure.

The inventors have determined that the geometrical consideration for the second material, in contrast to those of the first material, can have a significant and surprising beneficial impact on the damping properties of the combined structure.

The cellular structure in section may comprise a plurality of adjoining cells, each having a cell wall. Each cell may define an internal void or space which is substantially fluid filled, typically with air. Preferably the voids within the cellular structure are not entirely filled or 'flooded' with the second material. The second material may occupy less than 50% of the total volume (including internal voids) of the structure. The second material may occupy less than 30%, or preferably less than 20% or 10% by volume of each cell or the internal space within each cell. The second material may occupy less than 5% by volume of the internal space within each cell.

The second material may comprise less than 50% by mass of the cellular structure. The second material may comprise less than 40% by mass of the cellular structure. The second material may comprise less than 30% or 20% by mass of the cellular structure.

Each cell wall may be angled in the form of a polygon having a plurality of edges and vertices. The second material may be located in the vicinity of said vertices. According to one embodiment, each cell may comprise a plurality vertices having acute internal angles. Each cell may be described as being concave or re-entrant in form. The second material may be located in the vicinity of said acute angles and may take the form of a fillet. Such fillets may comprise less than 25% of the mass of cellular structure.

Additionally or alternatively, the second material may be located in between cell walls of adjacent cells within the cellular structure. Such interlayers may comprise less than 25% of the mass of the cellular structure. The second material may form a continuous layer between adjacent cell walls.

Each cell may define a void therein, which may be gas filled, for example with air.

The second material may comprise an elastomer. The location of the elastomer insert can be chosen so that it is excited to a greater or lesser extent according to the vibration modes present in service. Typically the elastomer has a higher intrinsic loss than the first material forming the cellular structure. The cellular structure may take the form of a, so-called, honeycomb structure.

According to a second aspect of the present invention, there is provided a method of manufacture of the vibration damping structure of the first aspect. Auxetic cellular structures, such as honeycombs, described herein have many advantages over conventional honeycombs including improved damping which can be achieved by carefully considering the deformation behaviour of the structure. Tailoring and use of such auxetic structures for damping applications may be considered a further aspect of the present invention, either alone or in combination with the use of the second material in conjunction therewith.

One or more working embodiments of the present invention are described in further detail below by way of example with reference to the accompanying drawings, of which:

FIG. 1 shows general cross-sections of cellular structures according to the prior art;

FIG. 2 shows a half longitudinal section view through a gas turbine engine in which the present invention may be used;

FIGS. 3a and 3b show a section view of two embodiments of vibration damping structure according to the present invention;

FIG. 4 shows detail of the interlayer of FIG. 3b;

FIG. 5 shows a cross section of a blade comprising a vibration damping structure according to the present invention;

FIG. 8 shows a plot of energy dissipation under uniaxal loading for an embodiment according to FIG. 3b; and, FIG. 9 shows a plot of energy dissipation under uniaxal loading for an embodiment according to FIG. 3a.

Figure 6:
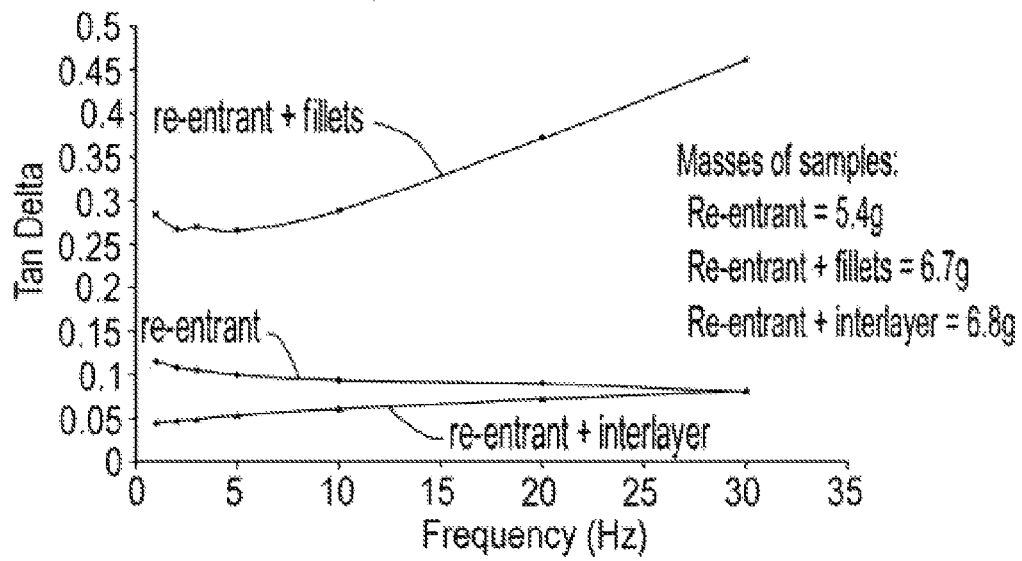
FIG. 6 shows a plot of loss against vibration frequency for three different vibration damping structures.

The present invention is derived around the general concept of insertion of an elastomer insert into a cellular structure, such as an auxetic honeycomb, to assist in absorption of vibrational energy. There exist a significant number of different industrial machinery applications in which the present invention may be advantageous, such as for example, gas turbine engines, industrial pumping equipment, power generation equipment and/or other types of propulsion equipment for use in aerospace, marine or land-based craft.

Whilst the embodiments of the present invention described below focus on the use of vibration damping structures for blades, such as fan blades, the skilled person will appreciate that the present invention may find application in any circumstances where conventional cellular materials have been previously proposed or adopted. It is to be noted that a majority of such applications currently under consideration involve provision of a cellular material as a filler between opposing walls of a larger component or structure.

With reference to FIG. 1, a ducted fan gas turbine engine generally indicated at 10 has a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and a core engine exhaust nozzle 20. A nacelle 21 generally surrounds the engine 10 and defines the intake 12, a bypass duct 22 and a bypass exhaust nozzle 23.

The gas turbine engine 10 works in a conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts.

A cross-section of a fan blade 13 comprising an internal structure 24 according to the present invention is shown in FIG. 5. It can be seen that opposing walls 26 and 28 of the fan blade 13 provide the gas washed surfaces in use and define there-between an internal cavity, in which the structure 24 is located. During operation the rotation of the fan and other compressors and turbines within the engine causes unwanted vibration. If unchecked, such vibrations can significantly reduce the performance of the engine and life of components therein. Accordingly the structure 24 is proposed to improve vibration damping properties of the blades 13.

Embodiments of the structure 24 are shown in FIG. 3. The arrangement of these structures is based on the general concept of adding phases or inserts into honeycombs, and only in particular locations. Thus the inserted material is not applied uniformly throughout the honeycomb, and instead, a majority of the space within the honeycomb is air-filled. Accordingly, the insert material may be considered to be distributed or dispersed throughout the cellular structure in a regular pattern relative to the geometry of the structure itself.

Thus on the scale of an individual cell, the insert material may be considered to be selectively located at or through a relatively small portion by volume of each cell. However on a global scale for the entire structure, the insert material can be considered to be substantially evenly dispersed throughout the multiple cells which make up the structure.

A primary functionality of the invention is where particular vibration modes, in a particular honeycomb in a particular application, strongly excite shear deformation in the elastomer insert. Rational predetermined targeting of inserts, such as elastomers for vibration damping, is an important aspect of the invention.

Turning to FIGS. 3a and 3b, there is shown two examples of structures 24, for which the vibration modes have been assessed and suitable elastomer inserts proposed. In both FIGS. 3a and 3b, the underlying structure comprises an auxetic cell arrangement. Such a structure may otherwise be described as 'dilational' or as having a negative Poisson's ratio. Poisson's ratio is defined as the negative of the transverse strain divided by the longitudinal strain. Accordingly, applying a unidirectional tensile force to auxetic material results in an increase in size in the transverse dimension.

Individual cells 30 within structure 24 comprise a wall 32. The cell wall 32 is angled about a plurality of vertices so as to form a closed geometric shape in section. In this embodiment, the walls 32 are hexagonal in shape, having re-entrant features so as to allow for lateral expansion in tension. The cells tessellate in section to form the structure 24. Each cell defines an internal air-filled cavity.

In FIG. 3a, vibration damping elements in the form of elastomer fillets 34 are located at the acute vertices of cells 30 within the structure 24. This type of arrangement is referred to below as a fillet damping honeycomb (FDH). Here it can be seen that the fillets 34 are regularly spaced throughout the structure at locations where it has been determined that the fillets will be strongly excited in operation.

In FIGS. 3b and 4, there is shown an alternative arrangement, in which the elastomer insert material is provided as a layer 36 between walls 32 of adjacent cells 30. This arrangement can be likened to a web of elastomer 36 which is interspersed throughout the structure 24 at the cell interfaces. In this embodiment, the layer is substantially continuous although the layer may be provided in discrete sections in alternative embodiments. This type of arrangement is referred to below as an interlayer-type or Constrained Layer Damping Honeycomb (CLDH) arrangement.

In both embodiments elastomers such as silicone rubber, polybutadiene and/or natural rubber may be used. More generally, an elastomer having a high intrinsic tangent loss coefficient may be used. It is found to be of benefit if a material displaying viscoelastic properties is used. The key property of the insert material 34, 36 is that it displays lower stiffness than that of the cell wall 32 material. In this regard, the additional elastomer material in the honeycomb absorbs vibrational energy. This allows honeycombs to exhibit significantly larger vibration damping (or loss coefficients) for minimal weight penalties, more so than in existing competitor technologies.

Dependent on the application of the structure in question, it is envisaged that a combination of FDH and CLDH techniques may be employed. For applications in which weight is less critical, the full FDH and CLDH insert materials may be used. In other applications, fillets may be provided at only some vertices of each cell. Additionally or alternatively, insert layers 36 may be provided along only some adjoining walls of the cell structure, such as for example only the oblique walls 32. Other wall interlayer configurations are possible dependent on application. Combinations of inter layer inserts and fillet inserts may be used to counter or juxtapose the damping behaviour of each.

In one example, the basic form of a thermoplastic or thermoset honeycomb structure 24 can be made via standard commercial processes such as injection moulding or extrusion. The elastomer insert can be added into the honeycomb via an additional step in either of these processes as will be understood by the skilled person using existing techniques. Such techniques may include so-called two-shot or multiple-shot injection moulding in which two or more different polymers are used to create a single conjoined structure in a single or multiple moulding cycles. In extrusion techniques, a plurality of dyes may be used to produce the different material parts of the structure, such as by co-extrusion.

For the purpose of manufacturing suitable assemblies for testing the cells were injection moulded. For FDH, the cells were adhered together into an array and the elastomer injected into the fillets under gravity in a vacuum. For CLDH, the cells were set out and the elastomer used as an adhesive to join the cells together into an array. Many elastomers, such as the silicone rubber, adhere extremely well to many materials. Thus it is proposed that the same techniques can be used for cellular structures formed of metallic materials and honeycombs. These techniques may also be applied to a commercial manufacturing process.

Since the inserts can be strongly adhered to the honeycomb using any of the above-proposed techniques, they may also be more robust than competing technologies.

Assemblies of or comprising metal honeycombs (typically of aluminium and/or steel) or comprising Nomex® (aramid paper) can be used as baseline structures within the current embodiment. The commercially available metal and/or aramid paper honeycombs have a centre-symmetric polygonal (hexagonal) structure. However, the elastomer insertion can be applied to general unit cells where internal convex cell angles are present, using either manual or robotic-controlled shot injections for the softer polymer. Whilst cells having geometry described above are a particular focus of the present invention, in principle the concept is applicable to cells with different geometry (such as non-reentrant, and/or circular cells), provided that the elastomer is located in a region of high strain energy dissipation (static and/or modal). Thus the insertion of elastomer inserts in 3D truss structures and/or foams would also provide desirous vibration damping properties providing suitable location of the insert material is accommodated.

The primary difference between the embodiments of FIGS. 3a and 3b is that elastomer material provides damping 'in parallel' or 'in series' respectively, with the stiffer honeycomb material. The location of the elastomer insert is important since it dictates how much deformation is likely in the elastomer and therefore the amount of vibrational energy absorbed and lost as heat. The geometry of the cell and the elastomer insert are now important factors in determining the overall loss coefficient for the honeycomb.

The key difference is that when in parallel (FDH) the elastomer has minimal effect on the overall stiffness of the honeycomb structure 24, whereas in series (CLDH) the mechanical anisotropy (i.e., different mechanical response along different directions) is increased. It has been found that such properties can be achieved with only a slight decrease in stiffness for special geometry configurations.

Both the FDH and CLDH structures have significantly improved loss coefficient in comparison with the native polymer-only version. The CLDH configuration provides energy dissipation during dynamic loading by the shearing of the viscoelastic interlayer. The FDH configuration provides the energy dissipation mainly through the increased strain energy during deformation at the honeycomb corners.

The location of the elastomeric inserts is optimal when they experience the largest deformation or highest strain energy levels. The increased weight penalty of the honeycomb imposed by the additional material can be minimised by carefully reducing the volume of the elastomer used so as to give maximal energy absorption per unit elastomer mass.

This has been assessed using numerical models, which can be refined such that they are optimised to predict suitable locations and elastomer insert volumes for applications in which the desired stiffness and/or loss coefficients are known.

Similar optimisation or modelling techniques can be applied to the geometry of the cells within the structure such that they are tailored for a desired vibration response either with or without the insert material therein.

Both numerical simulation and experimental results for differing geometries show relatively large improvements in loss coefficient with only a small penalty in terms of increased density.

Figure 7:
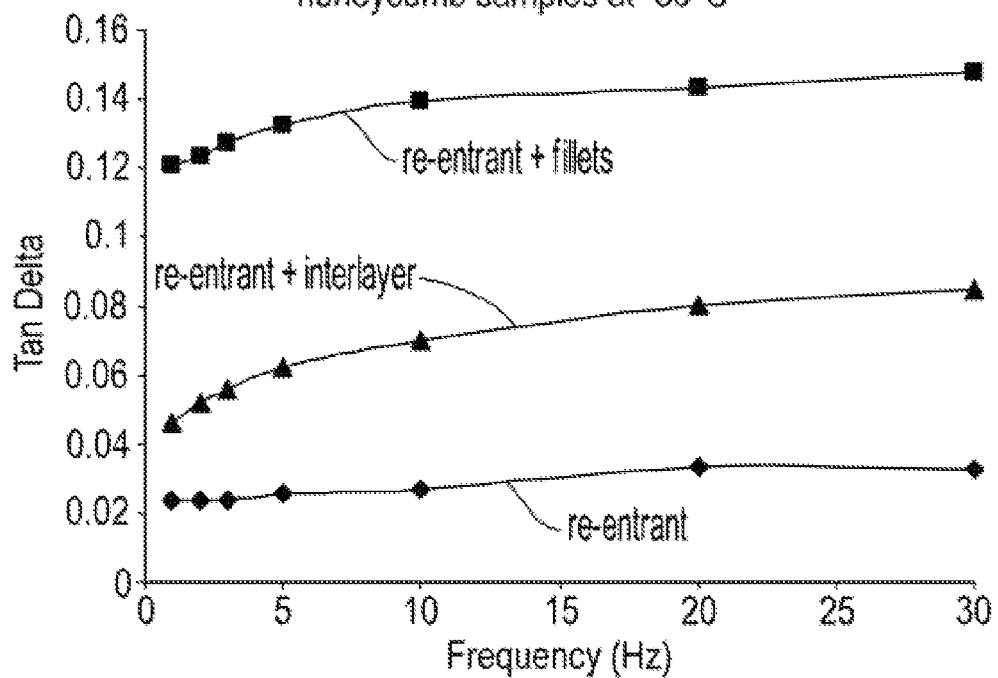
FIG. 7 shows a further plot of loss against vibration frequency for three different vibration damping structures.

FIGS. 6 and 7 show plots of the loss (termed here as 'Tan delta') for two geometries of structure according to the present invention and a native acrylonitrile-butadiene-styrene (ABS) only cell, against the frequency of the excitation. A value of tan delta of 0.3 and above for the fillet is exceptionally high.

The masses of the ABS structure and the FDH and CLDH structures are given in FIG. 6 by way of comparison. Dependent on the particular application of the structure, the criticality of its weight, and the desired vibration response, it is envisaged that the structure may comprise between 10 and 50% mass of insert material.

In FIG. 7 it can be seen that the response changes significantly at −50° C. but that both FDH and CLDH variants give improved loss coefficients across the range of frequencies considered.

With reference to FIGS. 8 and 9, the parametric models indicate that the energy dissipation during in-plane uniaxial loading is improved for the FDH configurations. The CLDH geometries are optimised for shear loading, rather than uniaxial loading. The common loading configuration in honeycombs for sandwich structures is the out-of-plane shear, where the core provides most of the resistance.

In FIGS. 8 and 9, the Y-axis provides an indication of the total energy dissipated during loading for the given shape of auxetic (re-entrant) cell geometry (30a or 30b) relative to that for a conventional hexagonal honeycomb cell (31a or 31b) having similarly arranged insert material. In this regard, the following parameter is used:

$(G.\eta)_{aux}/(G.\eta)_{hexa}$ where $(G.\eta)$ is the product of the shear modulus, G, with the loss factor, q, for auxetic and conventional hexagonal honeycomb structures respectively.

In FIG. 8, CLDH out-of-plane loading configurations 1 and 2 for different thickness ratios of the interlayer viscoelastic core (c/f ratio) are shown.

In FIG. 9, FDH out-of-plane loading configurations 1 and 2 for different viscoelastic fillet ratios (d/f ratio) are shown.

It can be seen that both the CLDH and FDH configurations provide excellent out-of-plane energy dissipated values, particularly for load direction 2 given in the figures, with the FDH giving more anisotropic response.

The different topologies show also similar strength behaviour in terms of Von Mises stresses under shear when loading along the xz plane, while the CLD structure shows 13% lower stresses compared to a corresponding FD structure in the yz plane.

TABLE 1

| Geometry | Von Mises stress Max [MPa] | |
| --- | --- | --- |
| CLD | 13.051 | 8.956 |
| FD | 15.034 | 8.937 |
| | Load yz (13) | Load xz (23) |

Table 1 shows Von Mises stresses for ABS frame (E=1.69 GPa) and silicone fillet/layer (E=27.6 MPa) for shear strain of 0.5%

Any field where honeycombs or cellular structures with large void fractions would be amenable to the use of targeted inserts such as are described above, particularly in applications where vibrations are problematic, and/or where it is important to maintain low structural weight. Despite a reduction therein by way of the present invention, the void fraction still remains relatively high in comparison to a filled honeycomb structure.

The invention claimed is:

1. A vibration damping body comprising an auxetic cellular structure having cell walls defining a plurality of adjoining cells therein, said cell walls being formed substantially of a first material having a first stiffness, the cellular structure further comprising a second material attached to said cell walls, the second material being selectively located throughout the cellular structure so as to comprise less than 50% by mass thereof and having a second stiffness which is lower than said first stiffness, wherein
individual cells are polygonal in section in relation to a longitudinal axis of the cell structure and include acute vertices, and the second material is provided in the form of fillets in at least some of the acute vertices.

2. The body according to claim 1, wherein the second material comprises less than 30% by mass of the cellular structure.

3. The body according to claim 1, wherein the second material occupies less than 50% by volume of the cellular structure including voids therein.

4. The body according to claim 1, wherein the cell walls are angled such that each cell in section takes the form of a re-entrant polygon in relation to a longitudinal axis of the cell structure.

5. The body according to claim 1, wherein the second material is attached between adjoining cell walls of adjacent cells within the cellular structure.

6. The body according to claim 5, wherein the second material forms a layer between the adjoining cell walls of adjacent cells.

7. The body according to claim 1, wherein the second material is an elastomer.

8. The body according to claim 1, wherein the first material is a polymer.

9. The body according to claim 1, wherein the second material is selectively positioned at predetermined locations in the cellular structure at which strain is predetermined to be greatest in use.

10. The body according to claim 1, comprising opposing outer walls, the cellular structure being constrained between said outer walls.

11. The body according to claim 1, comprising a blade.

12. The body according to claim 1, wherein the second material occupies less than 30% by volume of the cellular structure including voids therein.

13. The body according to claim 1, wherein the second material occupies less than 20% by volume of the cellular structure including voids therein.

14. The body according to claim 1, wherein the second material occupies less than 10% by volume of the cellular structure including voids therein.

15. The body according to claim 1, wherein the second material comprises less than 20% by mass of the cellular structure.

16. A method of manufacturing a vibration damping body, comprising:
forming substantially of a first material an auxetic cellular structure having cell walls defining a plurality of adjoining cells therein, said first material having a first stiffness, and
bringing a second material into a binding relationship with said first material at selective locations within the cellular structure, such that the second material comprises less than 50% by mass of said cellular structure, said second material having a second stiffness which is lower than said first stiffness, wherein
individual cells are polygonal in section in relation to a longitudinal axis of the cell structure and include acute vertices, and the second material is provided in the form of fillets in at least some of the acute vertices.

17. The manufacturing method according to claim 16, wherein the first and second material portions of said cellular structure are co-formed.

18. The manufacturing method according to claim 16, wherein the second material is bonded to the cell walls of said cellular structure.

19. The manufacturing method according to claim 16, wherein the first and/or second material portions are formed by a moulding process.

20. A vibration damping body comprising an auxetic cellular structure having cell walls defining a plurality of adjoining cells therein, said cell walls being formed substantially of a first material having a first stiffness, the cellular structure further comprising a second material attached to said cell walls, the second material being selectively located throughout the cellular structure so as to comprise less than 50% by mass thereof and having a second stiffness which is lower than said first stiffness, wherein
the second material is attached between adjoining cell walls of adjacent cells within the cellular structure.

21. A method of manufacturing a vibration damping body, comprising:
forming substantially of a first material an auxetic cellular structure having cell walls defining a plurality of adjoining cells therein, said first material having a first stiffness, and
bringing a second material into a binding relationship with said first material at selective locations within the cellular structure, such that the second material comprises less than 50% by mass of said cellular structure, said second material having a second stiffness which is lower than said first stiffness, wherein
the second material is attached between adjoining cell walls of adjacent cells within the cellular structure.

* * * * *